United States Patent [19]
Louthan

[11] 3,890,213
[45] June 17, 1975

[54] MERCAPTOALKYLTRIALKOXYSILANE PRODUCTION

[75] Inventor: Rector P. Louthan, Bartlesville, Okla.

[73] Assignee: Phillips Petroleum Company, Bartlesville, Okla.

[22] Filed: Aug. 28, 1973

[21] Appl. No.: 392,234

[52] U.S. Cl. .................................. 204/158
[51] Int. Cl. ................................. B01j 1/10
[58] Field of Search ..................... 204/158 R

[56] References Cited
UNITED STATES PATENTS
3,050,452  8/1962  Louthan .................... 204/181
3,078,292  2/1963  Prober ...................... 204/181

Primary Examiner—Howard S. Williams

[57] ABSTRACT

Preparation of mercaptoalkyltrialkoxysilanes by reacting hydrogen sulfide with ethylenically unsaturated trialkoxysilanes in the presence of ultraviolet radiation. In accordance with preferred embodiments of the invention, the reaction is carried out in the presence of organic trialkylphosphite reaction promoters. The products have utility as adhesive promoters and coupling agents.

9 Claims, No Drawings

MERCAPTOALKYLTRIALKOXYSILANE PRODUCTION

This invention relates to the preparation of mercaptoalkyltrialkoxysilanes. In accordance with another aspect, this invention relates to the preparation of mercaptoalkyltrialkoxysilanes by reacting hydrogen sulfide with ethylenically unsaturated trialkoxysilanes in the presence of ultraviolet radiation. In accordance with a further aspect, the photochemical reaction of ethylenically unsaturated aliphatic trialkyloxysilanes and hydrogen sulfide in the presence of ultraviolet radiation is substantially promoted by carrying out the reaction in the presence of an organic trialkylphosphite reaction promoter.

There is a growing demand for mercaptoalkyltrialkoxysilanes as adhesive promoters and coupling agents particularly between siliceous substances, such as clays, and various organic resins, particularly of the diene polymers.

The preparation of mercaptans and sulfides by reacting hydrogen sulfide with organic compounds containing ethylenic linkages in the presence of ultraviolet radiation and a reaction promoter is disclosed and claimed in U.S. Pat. No. 3,050,452, issued Aug. 21, 1962.

The literature (Chemical Reviews, volume 52, 1953, pages 85–88) teaches: "The fact that the silicon atom is larger, less electronegative, and capable of a greater maximum coordination number than the carbon atom makes the silicon-carbon bond considerably more reactive than the carbon-carbon bond toward a number of reagents. For example, aryltrimethylsilanes are cleaved by acids under fairly mild conditions to give trimethylsilanol and a substituted benzene while tert-butylbenzenes are relatively stable toward acids." Therefore, one would not expect that ethylenically unsaturated aliphatic trialkoxysilane would react with hydrogen sulfide to produce mercaptoalkyltrialkoxysilane. Particularly in view of U.S. Pat. No. 3,376,188, column 3, lines 42–45, which states: "All of these silanes (column 3, line 35, shows 'beta mercaptoethyltrimethoxysilane') are believed to be effective upon being contacted even with minute amounts of water and are thus at least partially converted into the corresponding silanols . . ."

Accordingly, an object of this invention is to provide a process for the production of mercaptoalkyltrialkoxysilanes.

A further object of this invention is to provide reaction promoters for the photochemical reaction of unsaturated trialkoxysilanes.

A further object of this invention is to provide a process whereby increased conversion of reactants as well as reaction rate are achieved.

Other objects, aspects and the several advantages of the invention will be apparent to those skilled in the art upon reading the specification, and the appended claims.

In accordance with the invention, a process is provided for the preparation of mercaptoalkyltrialkoxysilanes which comprises reacting an ethylenically unsaturated trialkoxysilane with hydrogen sulfide in the presence of ultraviolet radiation.

In accordance with one embodiment of the invention, the reaction of ethylenically unsaturated trialkoxysilanes with hydrogen sulfide in the presence of ultraviolet radiation is promoted by carrying out the reaction in the presence of organic trialkylphosphite reaction promoters.

This invention resides in the discovery that the photochemical reaction of ethylenically unsaturated aliphatic trialkoxysilanes and hydrogen sulfide in the presence of ultraviolet radiation can be substantially promoted by carrying out said reaction in the presence of an organic trialkylphosphite promoter such as those having the general formula $(RO)_3P$, wherein R is an alkyl radical having from 1 to 10 carbon atoms, and preferably where each R is the same normal alkyl radical having 1 to 5 carbon atoms. By carrying out these reactions in the presence of these reaction promoters, the conversion of the ethylenically unsaturated aliphatic trialkoxysilanes is substantially increased, as well as the rate of reaction, and that increased yields of mercaptoalkyltrialkoxysilanes are obtained.

Although only trimethyl phosphite was tested as a promoter in my invention, the following phosphite promoters are suggested to those skilled in the art as being operable in my invention: trimethyl phosphite, triethyl phosphite, tripropyl phosphite, tributyl phosphite, tripentyl phosphite, dimethyl ethyl phosphite, diethyl methyl phosphite, methyl ethyl propyl phosphite, dimethyl propyl phosphite, diethyl butyl phosphite, dibutyl propyl phosphite, trihexyl phosphite, triheptyl phosphite, trioctyl phosphite, trinonyl phosphite, tridecyl phosphite, dihexyl octyl phosphite, hexyl heptyl octyl phosphite, dihexyl nonyl phosphite, dimethyl decyl phosphite, didecyl pentyl phosphite, triisopropyl phosphite, triisopentyl phosphite, triisobutyl phosphite, dimethyl isobutyl phosphite, diethyl isooctyl phosphite, and the like.

Although only vinyltrimethoxysilane and vinyltriethoxysilane were reacted with hydrogen sulfide in the presence of ultraviolet radiation according to my invention, the following silanes are suggested to those skilled in the art as being operable in my invention are the monoethylenically unsaturated aliphatic trialkoxysilanes wherein the monoethylenically unsaturated aliphatic radical contains from 2 to 20 carbon atoms.

Further, it is suggested to those skilled in the art that the product from the reaction of a monoethylenically unsaturated aliphatic trialkoxysilane with hydrogen sulfide in the presence of ultraviolet radiation according to my invention is a mercaptoalkyltrialkoxysilane having the formula $(RO)_3SiR'SH$ wherein $R'$ is an alkylene hydrocarbon radical containing from 2 to about 20 carbon atoms and where each R is an alkyl radical containing from 1 to about 20 carbon atoms, and wherein the total number of carbon atoms in the mercaptoalkyltrialkoxysilane molecule does not exceed about 40.

Representative monoethylenically unsaturated aliphatic trialkoxysilanes suggested to those skilled in the art which may be reacted with hydrogen sulfide in the presence of ultraviolet radiation according to my invention are: vinyltrimethoxysilane, vinyltriethoxysilane, vinyltrihexoxysilane, vinyl eicosoxydecoxyoctoxasilane, octenyltrimethoxysilane, eicosenyltripentoxysilane, and the like.

In accordance with one specific embodiment of the invention, mercaptoethyltrimethoxysilane is produced in high yields and at increased reaction rates by carrying out the reaction of vinyltrimethoxysilane with hydrogen sulfide in the presence of ultraviolet radiation and a trialkylphosphite, specifically trimethylphosphite, as the reaction promoter. In another embodiment, mercaptoethyltriethoxysilane is produced in increased yields and at increased rates by carrying out the reaction of vinyltriethoxysilane with hydrogen sulfide in the presence of ultraviolet radiation and a trialkylphosphite, specifically trimethylphosphite, as the reaction promoter.

Although only Hanovia high pressure mercury lamps of 100 watts and 7500 watts were used to provide ultraviolet radiations for the reaction of my invention, it is suggested to those skilled in the art that any suitable source of radiation providing wave lengths in the ultraviolet range can be used including mercury lamps and hydrogen discharge tubes. The amount of radiation can vary over a wide range and will be dependent upon many factors such as the particular ethylenically unsaturated aliphatic trialkoxysilane used as a reactant and the amount thereof, the source of radiation, the particular promoter used, and other considerations. The particular reaction vessel used should be transparent in whole or part to ultraviolet radiation of the desired wavelengths. The mercury lamps were placed inside quartz tubes which were sealed into both ends of the reactor, so that the reaction solution was contained in the annular space between the quartz tube and the inside of the reactor.

The reaction of my invention was carried out as a batch reaction. It is concluded that intermittent or continuous reaction can also be used. I have carried out the reaction of my invention in the range of temperature of 70° to 150°F (21° to 66°C), a pressure in the range of 110 to 500 psig, and from 0.5 to 7 hours of irradiation time. It is concluded that the reaction temperature can vary over a wide range, and generally will be within the range of about 0° to 300°F, although the upper limit is dictated by pressure. It is necessary to have sufficient pressure to maintain liquid phase.

We have shown by data in the examples of my invention that the hydrogen sulfide can range from 2 moles $H_2S$ per mole of vinyltrimethoxysilane or of vinyltriethoxysilane to 10 moles $H_2S$ per mole of vinyltrimethoxysilane or vinyltriethoxysilane.

EXAMPLE I

A number of runs were carried out in which $H_2S$ was reacted with vinyltrimethoxysilane in the presence of ultraviolet radiation promoted with trimethylphosphite.

These runs were carried out in a 500 cc. stainless steel reactor which was fabricated from a 3-inch stainless steel pipe, approximately 6 inches long. A 33 mm. I.D. quartz tube was sealed into both ends of the reactor so that the reaction solution could be contained in the annular space between the quartz tube and the inside of the stainless steel pipe. The reactor was equipped with a pressure gauge, a thermowell and a cooling coil through which tap water flowed. Inlet tubes with valves were provided in order to charge the reactants.

The vinyltrimethoxysilane used as the reactant in this example had the following properties:

| | |
|---|---|
| Molecular Weight | 148 |
| Specific Gravity 25°C/25°C | 0.95 |
| Open cup flash point | 70°F |
| Boiling Point: | |
| 10 mm | 22°C |
| 760 mm | 123°C |
| Chloride | less than 10 ppm |
| Composition: | |
| vinyltrimethoxysilane | 96.5% |
| Lights (primarily methanol) | 2.5% |
| Heavies | 1.0% |

In each run, vinyltrimethoxysilane, the trimethylphosphite promoter, when used, and hydrogen sulfide (Technical Grade) were charged to the reactor. The reactor was mounted on the shaker and a small amount of $H_2S$ was bled through the system to sweep out any air present. A lighted 100 watt high pressure mercury vapor lamp was inserted in the quartz tube and the shaker started. Small samples were withdrawn periodically from the reactor. These samples, after the unreacted $H_2S$ had weathered off, were analyzed by gas-liquid chromatography (GLC). At the end of the irradiation period most of the unreacted $H_2S$ was vented and the remaining liquid product was discharged from the reactor into a distillation pot. This liquid reaction product was distilled in an 18 inch × 3/4 inch I.D. glass helices packed distillation column at 10 mm pressure to obtain lights (material collected in dry ice-acetone cooled trap), mercaptoethyltrimethoxysilane (major portion boiling from 174° to 179°F at 10 mm), the corresponding sulfide bis(2-[trimethoxysilyl]ethyl)sulfide (major portion boiling from 352° to 359° F at 10 mm), and heavies (kettle bottoms). GLC analysis of both the mercaptan cut and sulfide cut indicated the presence of a small amount of materials (estimated to be from 3 to 4 weight percent) boiling slightly lower than the main products. These lower boiling materials were assumed to be the secondary mercaptan and sulfide.

The data obtained in the reaction of $H_2S$ with vinyltrimethoxysilane in the presence of ultraviolet radiation and promoted with trimethylphosphite are reported in Table I.

EXAMPLE II

The reaction of hydrogen sulfide with vinyltriethoxysilane in the presence of ultraviolet light and promoted with trimethylphosphite was carried out as described in Example I. The vinyltriethoxysilane used as the reactant in this example had the following properties:

| | |
|---|---|
| Molecular Weight | 190 |
| Specific Gravity 25°C/25°C | 0.89 |
| Boiling Point at 760 mm | 161°C (322°F) |
| Refractive Index 25°C | 1.3966 |
| Purity by Gas-Liquid Chromatography | 98.2% |

At the end of the irradiation period most of the excess hydrogen sulfide was vented and the remaining liquid discharged into a distillation pot. This liquid reaction product was distilled in an 18 inch × 3/4 inch I.D. glass helices packed distillation column at 10 mm. pressure to give the following:

Lights (material collected in dry ice-acetone cooled trap)

Unreacted vinyltriethoxysilane, major portion boiling at 124°F at 10 mm

Mercaptoethyltriethoxysilane, major portion boiling from 199° to 203°F at 10 mm

Corresponding Sulfide bis(2-[triethoxysilyl]ethyl) sulfide, major portion boiling from 356° to 363°F at 10 mm.

The data are reported in Table II.

TABLE I

MERCAPTOETHYLTRIMETHOXYSILANE FROM THE ULTRAVIOLET LIGHT PROMOTED ADDITION OF HYDROGEN SULFIDE TO VINYLTRIMETHOXYSILANE (VTMSi)

| Run No. | Reactants H$_2$S, Grams | Reactants VTMSi, Grams | Promoter Trimethyl-Phosphite Volume % ml of VTMSi | Reactant Mole Ratio H$_2$S/VTMSi | Operating Conditions Temperature °C | Operating Conditions Pressure psig | Operating Conditions Irradiation Time, Hours | Products by Distillation Wt./100 Wt.VTMSi Charged Lights[1] | RSH[2] | RSR[3] | Heavies | Yields[4] Mole % Based on VTMSi RSH | RSR |
|---|---|---|---|---|---|---|---|---|---|---|---|---|---|
| 1 | 102.0 | 222.0 | 2.3 | 1.0 | 2/1 | 29-33 | 136-162 | 3 | 5.0 | 63.8 | 44.0 | 1.7 | 51.9 | 39.5 |
| 2 | 127.5 | 185.0 | 2.0 | 1.0 | 3/1 | 29-33 | 185-196 | 4 | 5.4 | 74.2 | 34.2 | 3.0 | 60.3 | 30.7 |
| 3 | 170.0 | 185.0 | 2.0 | 1.0 | 4/1 | 29-34 | 227-230 | 4 | 4.9 | 81.8 | 28.5 | 1.8 | 66.5 | 25.6 |
| 4 | 212.5 | 185.0 | 2.0 | 1.0 | 5/1 | 29-34 | 236-252 | 4 | 4.9 | 84.0 | 26.0 | 2.2 | 68.3 | 23.3 |
| 5 | 212.5 | 185.0 | 3.0 | 1.5 | 5/1 | 29-34 | 245-252 | 4 | 5.4 | 85.5 | 26.6 | 1.8 | 69.5 | 23.9 |
| 6 | 255.0 | 111.0 | 1.2 | 1.0 | 10/1 | 30-35 | 330-337 | 4 | 5.4 | 92.7 | 13.2 | 1.8 | 75.4 | 11.8 |

(1) Material collected in dry ice-acetone cooled trap. Includes unreacted vinyltrimethoxysilane (VTMSi).
(2) RSH is mercaptoethyltrimethoxysilane.
(3) RSR is the corresponding sulfide, bis(2-[trimethoxysilyl]ethyl) sulfide.
(4) Yields calculated assuming vinyltrimethoxysilane (VTMSi) was 100% pure.

TABLE II

MERCAPTOETHYLTRIETHOXYSILANE FROM THE ULTRAVIOLET LIGHT PROMOTED ADDITION OF HYDROGEN SULFIDE TO VINYLTRIETHOXYSILANE (VTESi)

| Run No. | H$_2$S, Grams | VTESi, Grams | Promoter Trimethyl-Phosphite Volume % ml. of VTESi | Reactant Mole Ratio H$_2$S/VTESi | Operating Conditions Temperature °C | Operating Conditions Pressure psig | Operating Conditions Irradiation Time, Hours | Products by Distillation Wt./100 Wt. VTESi Charged Lights[1] | RSH[2] | RSR[3] | Heavies | Yields[4] Mole % Based on VTESi RSH | RSR |
|---|---|---|---|---|---|---|---|---|---|---|---|---|---|
| 1 | 95.2 | 266.0 | 2.7 | 1.0 | 2/1 | 21-24 | 110-112 | 5 | 7.1 | 64.5 | 36.7 | 2.9 | 54.7 | 33.7 |
| 2 | 238.0 | 133.0 | 1.5 | 1.0 | 10/1 | 23-31 | 190-222 | 5 | 5.1 | 92.6 | 6.1 | 5.6 | 78.6 | 5.1 |

(1) Material collected in dry ice-acetone cooled trap. Includes unreacted vinyltriethoxysilane (VTESi).
(2) RSH is mercaptoethyltriethoxysilane.
(3) RSR is the corresponding sulfide, bis(2-[triethoxysilyl]ethyl) sulfide.
(4) Yields calculated assuming vinyltriethoxysilane (VTESi) was 100% pure.

EXAMPLE III

In this example, 102 grams of hydrogen sulfide was reacted with 222 grams of vinyltrimethoxysilane in the presence of ultraviolet light as described in Example I. Some of the runs contained the promoter trimethylphosphite, while other runs were without the promoter. The reactant mole ratio of H$_2$S/vinyltrimethoxysilane was 2/1. The runs with trimethylphosphites contained one (1) volume percent trimethylphosphite based on the vinyltrimethoxysilane. Small samples were withdrawn periodically from the reactor. These samples after the unreacted H$_2$S had weathered off were analyzed by gas-liquid chromatography (GLC) and that data were used to calculate the percent conversion of vinyltrimethoxysilane reported in Table III.

TABLE III

PREPARATION OF MERCAPTOETHYLTRIMETHOXYSILANE: EFFECT OF REACTION PROMOTER (TRIMETHYLPHOSPHITE)

| Run No. | Operating Conditions Temperature °C | Pressure psig | Irradiation Time, Hours | VTMSi Conversion Percent |
|---|---|---|---|---|
| Without Promoter | | | | |
| 1 | 31 | 168 | 0 | — |
| 2 | 30 | 160 | 0.5 | 27 |
| 3 | 30 | 154 | 1 | 43 |
| 4 | 30 | 154 | 2 | 56.3 |
| 5 | 30 | 154 | 3 | 64.4 |
| 6 | 27 | 154 | 4 | 71.3 |
| 7 | 27 | 154 | 5 | 74 |
| 8 | 27 | 155 | 6 | 76.4 |
| 9 | 27 | 155 | 7 | 78.8 |
| With Promoter (Trimethylphosphite) | | | | |
| 10 | 31 | 162 | 0 | — |
| 11 | 33 | 139 | 0.5 | 54.3 |
| 12 | 32 | 136 | 1 | 70.5 |
| 13 | 30 | 138 | 2 | 85.6 |
| 14 | 29 | 138 | 3 | 94.5 |

The data in Table III show a substantial increase in conversion of vinyltrimethoxysilane when the reaction is carried out in the presence of a reaction promoter of this invention. With no trimethylphosphite promoter the reaction was sluggish since less than 80 percent of the vinyltrimethoxysilane had been converted after seven hours irradiation. The presence of the trimethylphosphite promoter in the reaction gave a substantially higher reaction rate so that about 95 percent of the vinyltrimethoxysilane was converted after only about 3 hours irradiation.

EXAMPLE IV

Two runs were carried out in which H$_2$S was reacted with vinyltrimethoxysilane in the presence of ultraviolet radiation and trimethylphosphite as a promoter. Each run was carried out in a 500 gallon stainless steel lined reactor. A quartz tube was sealed into both ends of the reactor so that the reaction solution was contained in the annular space between the quartz tube and the inside of the reactor. The quartz tube contained four 7500 watts mercury vapor lamps. The reactor was equipped with a pressure gauge, a thermowell, and a cooling jacket. The reactor content was stirred with a turbine type mixer.

For each of the two runs a batch charge of 1230 pounds of vinyltrimethoxysilane, 2623 pounds of H$_2$S and 14 pounds of trimethyl phosphite was made to the reactor. The reactor pressure was in the range of 400 to 500 psig, and the reactor temperature was in the range of 80° to 150°F. The reaction time of irradiation was about three hours.

The reaction product from both batches were combined and then fractionated using high pressure (200 psig) steam and vacuum jets to produce about 1659 pounds of mercaptoethyltrimethoxysilane. The chromatographic analysis of the mercaptoethyltrimethoxysilane was:

| Component | % |
|---|---|
| Unknown | 1.1 |
| (2-mercaptoethyl)trimethoxysilane | 94.7 |
| (1-mercaptoethyl)trimethoxysilane | 4.2 |
| Total | 100.0 |

EXAMPLE V

Three batches were carried out in which $H_2S$ was reacted with vinyltriethoxysilane in the presence of ultraviolet radiation in a 500 gallon reactor as described in Example IV. The reactor pressure was in the range of from about 400 to about 450 psig, and the reactor temperature was in the range of from about 80° to about 150°F. The reaction time of irradiation for each batch was about 6 hours. Data are reported in Table IV.

The fractionation procedure was to remove the low-boiling impurities at essentially atmospheric pressure, then to lower the pressure slowly until a vacuum fractionation of 5 mm Hg was conducted to obtain the product — mercaptoethyltriethoxysilane.

Actual recovery of mercaptoethyltriethoxysilane from the 3200 pounds of vinyltriethoxysilane was 1,765 pounds for a theoretical yield of 47 percent. The specific gravity 60/60°F. of the product was 0.9975 with a purity of 92.4 weight percent determined by gas liquid chromatography.

TABLE IV

Mercaptoethyltriethoxysilane from the Ultraviolet Light Promoted Addition of Hydrogen Sulfide to Vinyltriethoxysilane (VTESi)

| | Reactor Batches | | | | | | |
|---|---|---|---|---|---|---|---|
| | 1 | | 2 | | 3 | | |
| Reactants | lbs. | moles | lbs. | moles | lbs. | moles | Total lbs. |
| $H_2S$ | 2,550 | 75 | 3,267 | 96 | 3,267 | 96 | 9,084 |
| VTESi | 1,600 | 8.4 | 800 | 4.2 | 800 | 4.2 | 3,200 |
| Total | 4,150 | | 4,067 | | 4,067 | | 12,284 |
| $H_2S$/VTESi, mole ratio[1] | | 8.9[2] | | 22.9 | | 22.9 | |

[1] $H_2S$/VTESi mole ratio is theoretical, based on pure $H_2S$. The $H_2S$ in batch No. 1 was about 80-90% pure. The $H_2S$ in batch No. 2 and No. 3 was about 90-95% pure.
[2] The $H_2S$ used in batch No. 1 contained 10 to 20 weight percent of propylene.

I claim:

1. A process for the preparation of mercaptoalkyltrialkoxysilanes which comprises reacting an ethylenically unsaturated trialkoxysilane with hydrogen sulfide in the presence of ultraviolet radiation.

2. A process according to claim 1 wherein said reaction is carried out in the presence of an organic trialkylphosphite reaction promoter.

3. A process according to claim 2 wherein said organic trialkylphosphite reaction promoter has the general formula $(RO)_3P$ wherein R is an alkyl radical having from 1 to 10 carbon atoms.

4. A process according to claim 1 wherein said ethylenically unsaturated trialkoxysilane is a compound wherein the unsaturated aliphatic radical contains from 2 to 20 carbon atoms.

5. A process according to claim 1 wherein said reacting is carried out at a temperature in the range 0°–300°F under a pressure sufficient to maintain liquid phase conditions with 2–10 moles $H_2S$ per mole of unsaturated trialkoxysilane for a period of time sufficient to produce mercaptoalkyltrialkoxysilanes.

6. A process according to claim 1 for the production of mercaptoethyltrimethoxysilanes which comprises reacting vinyltrimethoxysilane with hydrogen sulfide in the presence of ultraviolet radiation.

7. A process according to claim 1 for the production of mercaptoethyltriethoxysilane which comprises reacting vinyltriethoxysilane with hydrogen sulfide in the presence of ultraviolet radiation.

8. A process according to claim 6 wherein said reaction is carried out in the presence of trimethylphosphite as a reaction promoter.

9. A process according to claim 7 wherein said reaction is carried out in the presence of trimethylphosphite as a reaction promoter.

* * * * *